United States Patent [19]
Thomas

[11] 3,879,109
[45] Apr. 22, 1975

[54] LASER WAVEFORM GENERATOR

[75] Inventor: Carlton F. Thomas, Ann Arbor, Mich.

[73] Assignee: KMS Fusion, Inc., Ann Arbor, Mich.

[22] Filed: June 21, 1973

[21] Appl. No.: 371,882

[52] U.S. Cl. .............................. 350/160 R; 350/169
[51] Int. Cl. ............................................... G02f 1/16
[58] Field of Search .......... 350/160, 161, 172, 169; 331/94.5; 356/112, 113; 250/199

[56] References Cited
UNITED STATES PATENTS

| | | | |
|---|---|---|---|
| 3,530,388 | 9/1970 | Guerra et al. | 331/94.5 |
| 3,532,890 | 10/1970 | Denton | 350/169 |
| 3,755,676 | 8/1973 | Kinsel | 350/169 |

*Primary Examiner*—William L. Sikes
*Attorney, Agent, or Firm*—Barnes, Kisselle, Raisch & Choate

[57] ABSTRACT

An apparatus for generating a beam of electromagnetic energy of selected waveform. This invention takes an electromagnetic energy beam of short time duration and divides it, using suitable beamsplitters, into a series of separate beams. These separate beams are then individually tailored and recombined to form a composite beam equal to the sum of the individual beams.

11 Claims, 4 Drawing Figures

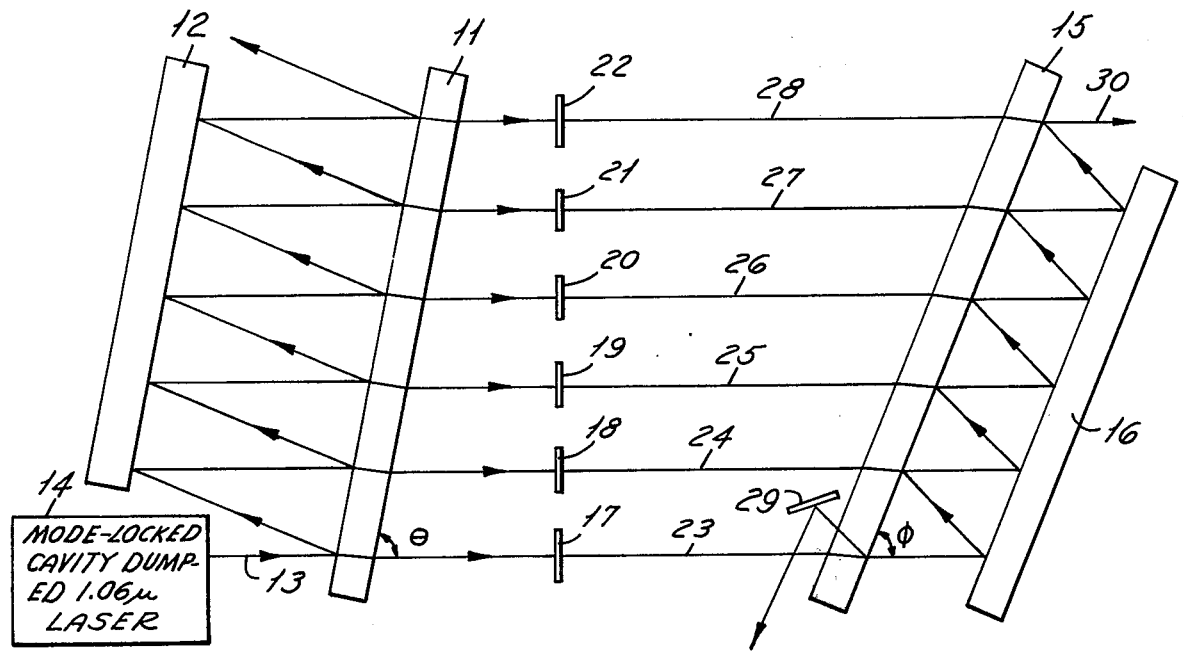
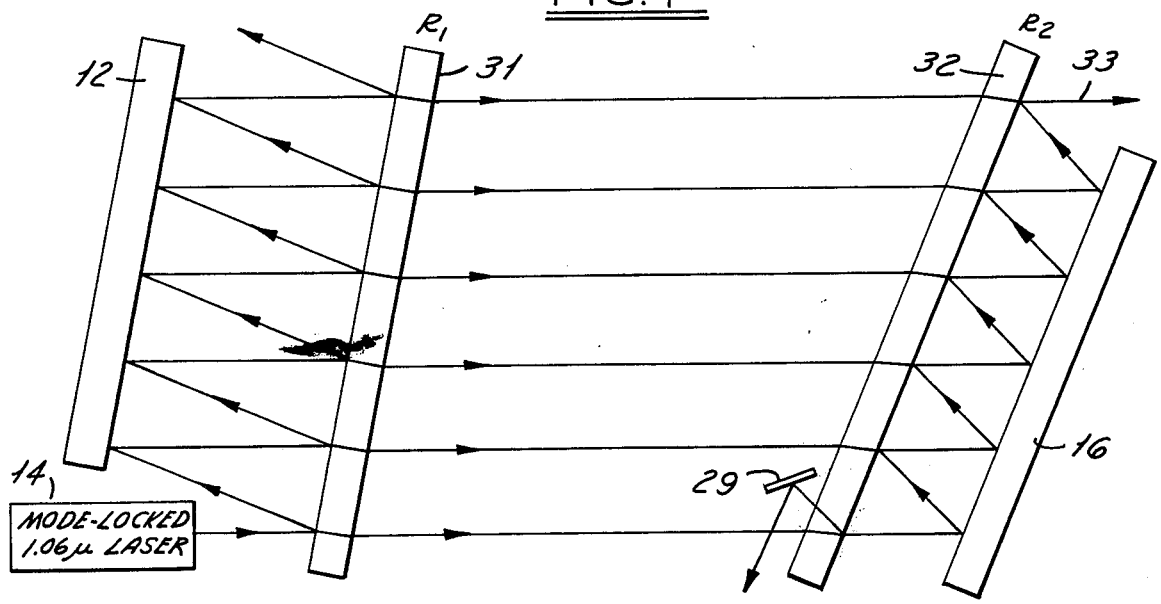
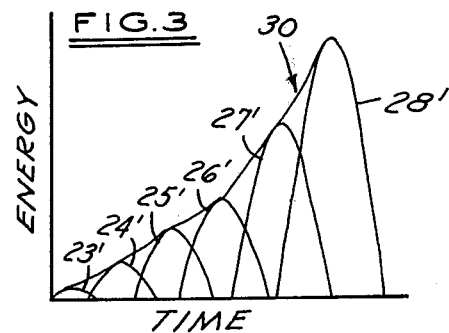

LASER WAVEFORM GENERATOR

This invention relates to a Laser Waveform Generator and more particularly to the generation of a beam of electromagnetic energy of preselected waveform.

Theoretical calculations of a laser driven fusion reaction indicate that the laser pulse should have a prescribed waveform as a function of time. There is an optimum pulse length which depends on the fuel pellet size and the laser energy available. For current laser fusion parameters, these optimum pulse lengths are in the range from 100 to 800 picoseconds.

In addition to pulse length, the shape of the laser pulse is important for successful implosion of the fuel pellet. The initial energy should be low, increasing rapidly as the implosion proceeds, and then falling off very rapidly after peak power is attained since further laser energy deposition will have little effect upon the reaction. Laser pulses generated using current technology do not approximate these conditions, and the pulse length and pulse shape cannot be easily adjusted.

The existing high power pulses lasers are Q-switched, yielding pulse lengths on the order of 30 nanoseconds. Shorter pulses are obtained either by passing the laser through an electro-optic shutter or by mode-locking the laser itself.

Electro-optic shutters are bandwidth limited. The shortest pulse length currently achievable using shutters is on the order of 1 to 3 nanoseconds. This pulse length is too long for the optimum fusion experiments and energy is wasted in the unused parts of the pulse. Control of wave shape is very difficult since a higher modulator bandwidth is required to control pulse shape.

By mode locking the laser oscillator, very short pulses (as short as 5 to 10 picoseconds) can be obtained by inserting bandwidth reducing etalons in the laser cavity. These pulses can be lengthened into the useful range of 100 to 800 picoseconds. However, there is no known method for controlling the shape of these degraded mode locked pulses.

It is, therefore, the primary object of this invention to disclose means whereby a pulse of electromagnetic energy of short time duration may be lengthened and modified into an energy beam of desired length and wave shape.

Another object of this invention is to provide a short diagnostic pulse for triggering observation of phenomena which occur during pellet implosion.

The above, as well as other objects, features and advantages of the invention will become apparent and better understood by reference to the following detailed description and claims when considered in connection with the accompanying drawings wherein:

FIG. 1 is the preferred embodiment of the invention.
FIG. 2 exemplifies an input pulse to the invention.
FIG. 3 exemplifies an output composite waveform of the invention.
FIG. 4 is a second embodiment of the invention.

Turning now to the preferred embodiment, FIG. 1 shows a beamsplitter 11 and a mirror 12 mounted parallel to each other on a mounting surface (not shown) at an angle theta ($\theta$) with respect to the light path 13 from the energy source 14. While the source of input energy in the preferred embodiment is shown to be a mode-locked laser, it should be understood that this invention may be used in different applications with any source of electromagnetic energy providing a suitable input pulse. Beamsplitter 15, having a reflectance/transmittance ratio equal to that of beamsplitter 11, and mirror 16 are mounted parallel to each other and at an angle phi ($\phi$) with respect to the input light path 13. It is to be understood that in the dimension not shown, that is, into the page, beamsplitters 11 and 15 are parallel to each other. Attenuators 17 through 22 are perpendicular to and intersecting light paths 23 through 28 respectively. Mirror 29 is located so as to intercept and reflect that portion of the light pulse or beam appearing on path 23 which is reflected off of beamsplitter 15. Mirror 29 is positioned at an angle suitable for the purpose to be described hereinafter.

An exemplary waveform of the input pulse used by the invention is shown in FIG. 2. This is the waveform of the beam that travels on path 13 from energy source 14.

The composite output beam or pulse appearing in FIG. 3 is intended for demonstrative purposes only. It will be shown that the user has a wide latitude in choosing the shape of the output pulse to suit his purposes. Composite output beam 30 has a waveform which is the summation of individual output beams 23' through 28'.

Operation of the preferred embodiment is as follows. A single pulse is generated by a suitable source of electromagnetic energy using conventional techniques. In this case, a mode-locked cavity dumped laser 14 generates a pulse on the order of 20 to 30 picoseconds. The pulse is directed onto beamsplitter 11 along path 13 where a portion of the energy is transmitted through the beamsplitter onto path 23 while the remainder is reflected onto mirror 12 to be again reflected onto beamsplitter 11. Some portion of this twice reflected energy will be transmitted through the beamsplitter onto path 24 while the remainder is again reflected onto mirror 12. The energy pulse on path 24 is parallel to that on path 23 but delayed by time:

$$t = 2L_1/C$$

where $C$ equals the speed of light and $L_1$ is the length of the light path from the beamsplitter to the mirror described by the equation:

$$L_1 = Lo/COS(\theta/2)$$

where $Lo$ is the separation between the mirror and the beamsplitter.

It can readily be seen that the results of the input pulse and five reflections are six parallel light beams or pulses, equally separated in time and space, appearing on paths 23 through 28. These pulses may now be individually adjusted in intensity by attenuators 17 through 22.

Beamsplitter 15 and mirror 16 combine to reform the parallel beams on paths 23 through 28 into a single output beam 30. However, separation of the second mirror-beamsplitter pair is less than that of the first, since, should they have the same separation as the first mirror-beamsplitter pair, the delays would cancel each other and all of the tailored pulses would exit the system at the same time. The separation between the second beamsplitter and mirror is therefore chosen such that the difference between the two time delays equals the desired pulse-to-pulse separation:

$$t = 2(L_1-L_2)/C$$

where $L_2$ is the light path between beamsplitter 15 and mirror 16. Note that the angle of the second mirror and beamsplitter with respect to the incident path 13 is decreased so that the pulses recombine in space to form a single beam.

Output beam 30 is shown in FIG. 3 as being the summation in time of beams 23' through 28'. Beam 23' is that portion of the beam on path 23 to be transmitted through beamsplitter 15 and reflected back and forth between mirror 16 and the beamsplitter onto the output path. It is evident from the geometry of the system that this "descendant" of the beam on path 23 will exit the system first, with beams on subsequent paths following thereafter. With this knowledge, it should be evident that selective attenuation of the beams on paths 23 through 28 will result in virtually any output beam waveform desired.

As an example, use of the invention without attenuators 17 through 22, or with attenuators of equal attenuation characteristics, will result in beams 23' through 28' being equal in amplitude. The composite beam will, therefore, approach a step junction. Similarly, selection of attenuators with linearly decreasing attenuation from 17 to 22 will result in a composite beam that approaches a sawtooth in waveform. The versatility of this invention can now be readily appreciated. It should also be evident that the output beam may be extended and shaped in time by extending beamsplitters 11 and 15 and mirrors 12 and 16 so as to increase the number of parallel paths to be recombined. The output beam may also be made periodic by activating energy source 14 at suitable intervals.

The reflected pulses from beamsplitter 15 are not used in formulating the output beam. FIG. 1 shows a combination wherein the reflection of the first light beam off of beamsplitter 15 and mirror 29 may be used as a diagnostic pulse. That is, this rejected pulse of light, since it is very short, may be used to trigger diagnostic monitoring equipment. In the inventor's embodiment, the diagnostic pulse was used as the "flash lamp" to illuminate the rapid events so that they could be photographed during a thermonuclear reaction.

FIG. 4 shows a second embodiment of the invention wherein identical numbers indicate components similar to those shown in the preferred embodiment of FIG. 1. The output beam from energy source 14 is incident upon beamsplitter 31 where it is split into two energy beams: (1) the reflected beam on a path toward mirror 12, and (2) the transmitted beam on a path toward beamsplitter 32. The light transmitted through beamsplitter 32 is incident upon mirror 16. The geometry of mirror 12 with respect to beamsplitter 31 and of mirror 16 with respect to beamsplitter 32 is identical to that stated for the mirror-beamsplitter pairs of FIG. 1. Likewise, the geometry of the mirror-beamsplitter pairs of FIG. 4 with respect to each other and with respect to the energy source is identical to that of the preferred embodiment. Operation of the second embodiment of FIG. 4 is similar to that of the preferred embodiment with one subtle modification. If the two beamsplitters have unequal reflectance/transmittance ratios, and, in particular, if the reflectance/transmittance ratio of the first beamsplitter is higher than that of the second beamsplitter, then the output composite pulse envelope 33 will have the form:

$$P(t) = P_0(1-R_1)(1-R_2) R_1^{N-1} e^{-a} e^{at/T}$$

where
$a = N \log_e R_1/R_2$
$R_1$ = reflectivity of first beamsplitter
$R_2$ = reflectivity of second beamsplitter
$N$ = number of smaller pulses in the composite output pulse
$T$ = composite pulse length
$P_0$ = amplitude of pulse on path 13

This exponential rising pulse is very desirable for the laser fusion operation. By selecting various beamsplitter reflectance ratios, various types of exponentially rising pulses may be synthesized.

Operation of this system can be visualized qualitatively as follows: The first pulse in the composite output pulse is the one that passes only once through the first beamsplitter and then is reflected back and forth thereafter within the closely spaced but low reflectivity second mirror-beamsplitter cavity. Due to this low reflectivity, the first pulse experiences heavy attenuation. The last pulse, however, travels exclusively in the high reflectivity and widely spaced first cavity. This last pulse experiences maximum delay and minimum attenuation. Thus, the composite pulse starts with weak intensity, builds up to a peak, and then falls off rapidly to zero.

Mirror 29 reflects a diagnostic pulse as was the case in the preferred embodiment.

The embodiments disclosed are shown for demonstrative purposes and are not intended to limit the scope of the invention.

I claim:

1. In combination with a source of electromagnetic energy which provides an incident beam along a beam axis, an electromagnetic energy pulse shaper comprising, first beamsplitting means having a surface disposed to intersect said beam axis at a first angle with respect thereto, a beam incident upon said surface of said first beamsplitting means along said axis being partially transmitted through said first beamsplitting means and partially reflected, first reflective means disposed in proximity to said surface of said first beamsplitting means in position to intersect beams reflected from said surface of said first beamsplitting means, said first reflective means being separated from said surface by a first distance, a beam incident upon said first reflective means being reflected back onto said surface of said first beamsplitting means to be partially transmitted through said first beamsplitting means and partially reflected, said partial transmission and partial reflection of said first beamsplitting means and said reflection of said first reflective means splitting said beam incident along said beam axis into at least a first split beam transmitted through said first beamsplitting means from said incident beam and a second split beam transmitted through said first beamsplitting means after having been at least once reflected at said surface of said first beamsplitting means and by said first reflective means, said first and second split beams being separated in time by an amount proportional to said first distance, second beamsplitting means having a surface disposed to lie in the path of beams transmitted through said first beamsplitting means at a second angle with respect to said beam axis, said first and second split beams being partially transmitted through and particlally reflected from said surface of said second beamsplitting means, and second reflective means disposed in proximity to said second beamsplitting means in position to intercept beams transmitted therethrough, said second reflective means being separated from said second beamsplitting means by a second distance which is unequal to said first distance, a beam incident upon said second reflective means being reflected back onto said second beamsplitting means, the reflection between said second reflective means and said second beamsplitting means combining said first and second split beams transmitted through said second beamsplitting means into a composite beam in which said first and second split beams are separated in time by an amount proportional to the difference between said first and second distances.

2. A combination of claim 1 wherein said first beamsplitting means are arranged parallel to said first reflective means.

3. The combination of claim 2 wherein said second beamsplitting means are arranged parallel to said second reflective means.

4. The combination set forth in claim 3 wherein said first angle is greater than said second angle.

5. The combination set forth in claim 1 wherein said first angle is unequal to said second angle.

6. The combination set forth in claim 1 wherein said first beamsplitting means has a first reflectance-transmittance ratio which defines the ratio of the intensity of said first split beam to said beam incident along said beam axis, and wherein said second beamsplitting means has a second reflectance-transmittance ratio which is unequal to said first reflectance-transmittance ratio.

7. The combination of claim 6 wherein the reflectance/transmittance ratio of said first beamsplitting means is greater than the reflectance/transmittance ratio of said second beamsplitting means.

8. The combination set forth in claim 1 further comprising attenuating means disposed between said first and second beamsplitting means to intercept and attenuate the intensity of at least one of said first and second split beams, the attenuated intensity of one of said first and second split beams being greater than the attenuated intensity of the other.

9. The combination set forth in claim 1 further comprising third reflective means disposed between said first and second beamsplitting means to intercept and reflect that portion of one of said first and second split beams which is reflected from said surface of said second beamsplitting means.

10. The combination set forth in claim 9 wherein said third reflective means is disposed to intersect and reflect that portion of said first split beam which is reflected from said surface of said second beamsplitting means.

11. The combination set forth in claim 1 wherein said first distance is greater than said second distance.

* * * * *